United States Patent [19]

Hoerner

[15] 3,687,251
[45] Aug. 29, 1972

[54] TORQUE TRANSMITTING DEVICE
[72] Inventor: Alfred J. Hoerner, St. Paul, Minn.
[73] Assignee: Minnesota Mining and Manufacturing Company, St. Paul, Minn.
[22] Filed: Feb. 1, 1971
[21] Appl. No.: 111,528

[52] U.S. Cl............192/46, 192/107 M, 192/107 T
[51] Int. Cl..........................F16d 11/00, F16d 41/00
[58] Field of Search......192/41 R, 46, 107 M, 107 T, 192/108; 188/82.1, 82.77

[56] References Cited

UNITED STATES PATENTS

| 2,158,873 | 5/1939 | Kaltwasser...............192/46 X |
| 3,143,895 | 8/1964 | Robie.....................74/107 X |
| 3,386,122 | 6/1968 | Mathison..................192/46 X |
| 3,434,577 | 3/1969 | Mathison....................192/46 |

Primary Examiner—Allan D. Herrmann
Attorney—Kinney, Alexander, Sell, Steldt & Delahunt

[57] ABSTRACT

A torque transmitting device comprising a pair of coaxially supported interfitting members having opposed curved torque transmitting surfaces. A plurality of straight fibers are secured to one of the surfaces and a plurality of projections engageable by the free ends of the fibers, for example opposed fibers, extend from the other surface to transmit torque between the members in at least one direction of rotation. The torque transmitting members are supported for relative axial movement to permit engagement and disengagement of the fibers and the projections.

8 Claims, 3 Drawing Figures

INVENTOR.
ALFRED J. HOERNER
BY Kinney, Alexander,
Sell, Steldt & DeLaHunt
ATTORNEYS 3,687,251

TORQUE TRANSMITTING DEVICE

BACKGROUND OF THE INVENTION

The present invention relates to a torque transmitting device in which the ends of fibers extending from one curved torque transmitting surface engage projections extending from an opposed curved torque transmitting surface to transmit torque between the surfaces to drive supporting members through the resistance of the fibers to deflection under compression loading.

Prior art coaxial drive couplings include friction clutches in which the driving force is transmitted by the friction of surfaces in contact and positive drive clutches in which jaws, dogs, or teeth in the two elements interlock. The conventional friction clutch has the built-in feature of controlled slippage to permit a gradual input of power which in many applications is disadvantageous in that there is an interval wherein full positive power transmission is not in effect. With an axially disengageable positive drive clutch, for example consisting of a pair of coaxially supported gears, axial alignment is critical and even if properly aligned upon engagement the elements may interfere instead of meshing, in which case upon starting the drive some degree of relative rotation will occur prior to proper engagement and the impact of the mating gear teeth may cause severe damage to the elements. Furthermore, in many applications the noise created by conventional positive drive clutches both during engagement and while running is highly objectionable.

More recently it has been discovered that torque may be transmitted between two surfaces through fibers which extend from at least one of the surfaces. Such devices eliminate the objectionable noises upon engagement and while running. Thus, in U.S. Pat. Nos. 2,424,973 and 2,941,410 there are illustrated devices in which torque may be transmitted from a driving member to a driven member through straight fibers that extend from both surfaces and intermesh. However, in each of these devices a major portion of the fibers are, at any time, disengaged and unavailable for transmitting torque. Since the amount of torque that may be transmitted is dependent on the resistance of the fibers to bending and the number of fibers which are engaged at any one time, the efficiency of these devices is undesirably limited. More efficient utilization of fibers has been made by the use of driving and driven members having facing planar torque transmitting surfaces perpendicular to their axis of rotation where the fibers extend from the facing surfaces and intermesh. Such devices are disclosed in U.S. Pat. No. 3,143,895 and in U.S. application Ser. No. 805,422 filed on Mar. 10, 1969, the latter being assigned to the assignee of the present application. However, while the utilization of facing planar torque transmitting surfaces more efficiently uses the fibers, yet in many applications to obtain the desired torque transmission the diameter required for the surfaces to provide a sufficient number of torque transmitting fibers is too large for the available space. Furthermore, in none of the above references is there disclosed interfitting torque transmitting members efficiently utilizing fibers or having a fiber orientation which would permit axial disengagement of the torque transmitting surfaces.

SUMMARY OF THE INVENTION

The torque transmitting device of the present invention overcomes the above disadvantages and comprises a pair of coaxially supported interfitting members having curved, normally opposed, generally parallel torque transmitting surfaces, at least one of which is supported for rotation about the common axis, a plurality of fibers secured to one of the torque transmitting surfaces, and a plurality of projections extending from the other of the torque transmitting surfaces for engagement by the free ends of the fibers. Each fiber extends from the surface to which it is secured to a plane generally perpendicular to the common axis of the torque transmitting members and at an angle less than 45° to a line intersecting its secured end and tangent to said surface. The projections are circumferentially spaced for engagement by free ends of the fibers to transmit torque between the members through the resistance of the fibers to deflection under compression loading. With this construction the torque transmitting surfaces may be axially disengaged and the torque transmitting capacity may be increased by increasing the axial length of the opposed torque transmitting surfaces by increasing their diameters.

THE DRAWING

Figure 1:
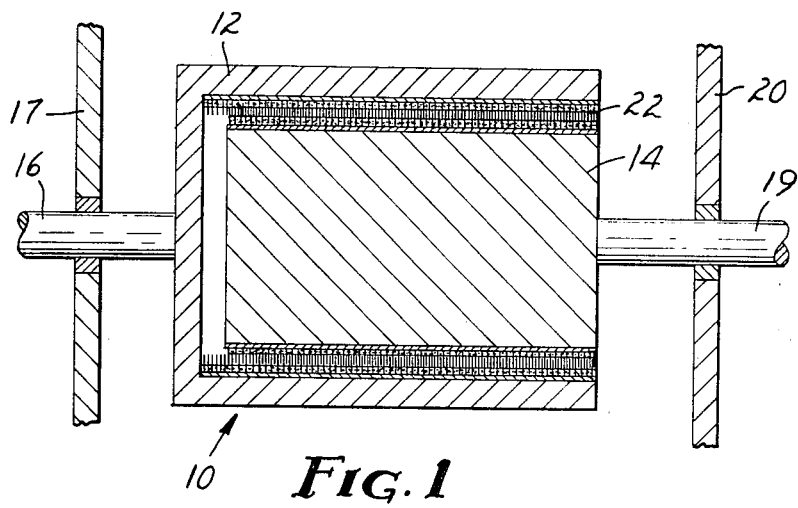
FIG. 1 is a longitudinal sectional view of a torque transmitting device constructed in accordance with the present invention.

Referring now to the drawings there is illustrated a torque transmitting device, generally designated 10, constructed in accordance with the present invention and comprising a first toruqe transmitting member 12 and a second interfitting torque transmitting member 14.

The first torque transmitting member, in the form of a hollow cylinder 12, has one closed end wall to which a support, illustrated as an axially extending shaft 16, is externally secured. The support shaft 16 is journaled in a support wall 17 to provide support for and to permit rotation of the first torque transmitting cylinder 12. The second torque transmitting member, in the form of a solid cylinder 14, has a lesser diameter than the internal diameter of the first torque transmitting cylinder 12. However, it is also contemplated by the present invention that the torque transmitting members 12 and 14 may comprise a pair of interfitting cones having their surfaces similarly inclined to their common axis at an angle less than 45°. A support shaft 19 is secured to one end of the second cylinder 14 coaxially therewith and is journaled in a support 20 to support the second torque transmitting cylinder 14 coaxially with the first torque transmitting cylinder 12.

The internal curved surface of cylinder 12 and the curved outer surface of cylinder 14 define curved, spaced, generally parallel, normally opposed torque transmitting surfaces. In accordance with the present invention a plurality of fibers 22 are secured to one of the torque transmitting surfaces. A plurality of projections circumferentially spaced with respect to the common axis of the cylinders 12 and 14 extend from the other of the torque transmitting surfaces to be engaged by the free ends of the fibers 22. In the illustrated embodiment the projections are defined by fibers 22 and the fibers extending from the two torque transmitting surfaces are of a similar denier and length and are randomly spaced on the normally opposed portions of the torque transmitting surfaces of the cylinders 12 and 14. Each fiber 22 has one end secured to one of the torque transmitting surfaces preferably by being imbedded in an adhesive layer that covers an exposed face of a flexible fabric backing secured to a torque transmitting surface. Each fiber 22 is secured to extend from a torque transmitting surface in a plane generally perpendicular to the common axis of the cylinders 12 and 14 and at an angle less than 45° to a line intersecting the secured end of the fiber and tangent to the torque transmitting surface. The fibers 22 may be synthetic, semisynthetic, regenerated or natural fibers. It is preferred to use nylon of about 10–500 denier per filament and a length of about 1–10 millimeters.

Figure 2:
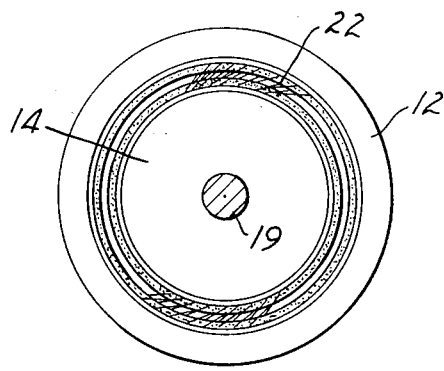
FIG. 2 is a cross-sectional view taken generally along line 2—2 of FIG. 1.
Figure 3:
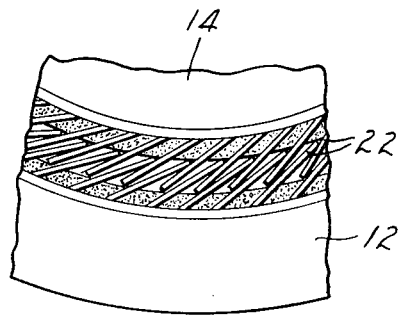
FIG. 3 is an end elevation view of a portion of the device of FIG. 1.

Preferably all of the fibers 22 secured to one of the torque transmitting surfaces extend therefrom in a single circular direction about the common axis of the torque transmitting cylinders 12 and 14 and the fibers on normally opposed portions of the torque transmitting surfaces extend in opposite circular directions, as illustrated in FIGS. 2 and 3. Thus, when the torque transmitting cylinders 12 and 14 are positioned as illustrated in FIG. 1 and one of the members is driven in the same circular direction as the fibers extend from its torque transmitting surface the fibers intermesh with the fibers extending from the opposed surface. Because the fibers extend from the normally opposed portions of the torque transmitting surfaces at an accute angle less than 45°, this rotation of one of the cylinders causes the fibers 22 extending from one surface to be driven toward the secured ends of the fibers 22 extending from the other surface and the free ends of the fibers 22 extending from each of the torque transmitting surfaces are then engaged with and trapped between the other opposed surface and the secured ends of the fibers extending from the other opposed surfaces. Torque is then transmitted between the cylinders through the resistance of the fibers to deflection under compression loading.

In accordance with the present invention, where bidirectional torque transmission may be desirable, the fibers 22 on each of the torque transmitting surfaces may also extend therefrom in both directions about the common axis of the cylinders 12 and 14 so long as the fibers on normally opposed portions of the torque transmitting surfaces extend in opposite circular directions. For example, the fibers may be secured to the torque transmitting surfaces in circular cylindrical bands of the same axial extent generated about a common axis with the fibers in adjacent bands on each torque transmitting surface extending in opposite circular directions. The fibers on normally opposed portions of the surfaces are then secured to extend in opposite circular directions. With such a fiber orientation portions of the fibers extending from the surfaces will intermesh in each direction of rotation when the cylinders 12 and 14 are supported with their torque transmitting surfaces normally opposed as illustrated in FIG. 1.

The support wall 17 for the first torque transmitting cylinder 12 may, for example, be a stationary wall in a machine and the associated support shaft 16 may carry a gear in a drive train. The support 20 for the second torque transmitting cylinder 14 may be movable axially along with shaft 19, which shaft may carry a gear in a second drive train within a gear box. Movement of the gear box of which the support 20 forms a part would then provide relative axial movement of the cylinders 12 and 14 to provide engagement and disengagement of the fibers. Alternatively, relative axial movement of the cylinders 12 and 14 may be provided by slidably bearing one or both of the support shafts 16 and 19 in their associated supports 17 and 20, respectively.

In use, the torque transmitting cylinders 12 and 14 are normally supported as illustrated in FIG. 1. One of the cylinders 12 or 14 is then driven in the circular direction that the fibers extend from its torque transmitting surface and the fibers on the opposed surfaces intermesh to transmit torque to the undriven cylinder through the resistance of the fibers to deflection under compression loading. Since in the illustrated embodiment all of the fibers extending from one of the torque transmitting surfaces extend therefrom in a single circular direction about the axis of the cylinders 12 and 14, driving of one of the cylinders in the direction opposed to the direction in which the fibers extend from its torque transmitting surface will not engage the fibers and the driven cylinder will rotate relative to the undriven cylinder. When it is not desired to transmit torque between the cylinders 12 and 14 and/or it is desired to provide a different function with the mechanism of which support 20 forms a part, the mechanism and support 20 are moved in a direction axially with respect to the cylinders 12 and 14 to remove the second torque transmitting cylinder 14 from within the first torque transmitting cylinder 12, thereby to disengage the fibers 22. Thus, the illustrated device forms an axially disengageable clutch.

Having described the present invention with respect to a preferred embodiment it is to be understood that minor modifications may be made without departing from the spirit or scope of the present invention.

I claim:

1. A torque transmitting device comprising:
    a pair of coaxially supported interfitting torque transmitting members having curved, spaced, generally parallel, normally opposed torque transmitting surfaces, at least one of said members being supported for rotation about the common axis,
    a plurality of fibers secured to one of said torque transmitting surfaces, each said fiber having one end secured to said one surface and extending therefrom in a plane generally perpendicular to said common axis and at an angle less than 45° to a line intersecting said secured end and tangent to said surface, with said fibers extending generally equal distances from said one surface, and
    a plurality of projections circumferentially spaced with respect to said common axis and extending from the other of said torque transmitting surfaces for engagement by the free ends of said fibers, whereby upon rotation of said one member said fibers engage said projections to transmit torque between said members through the resistance of said fibers to deflection under compression loading.

2. A torque transmitting device as recited in claim 1 including means supporting said pair of torque transmitting members for relative axial movement to permit disengagement of said fibers and said projections.

3. A torque transmitting device as recited in claim 2 wherein said other member is independently supported for rotation about said common axis to form an axially disengageable clutch.

4. A torque transmitting device as recited in claim 1 wherein said projections comprise a plurality of fibers secured to said other torque transmitting surface, each said fiber having one end secured to said other surface and extending therefrom in a plane generally perpendicular to said common axis and at an angle less than 45° to a line intersecting said secured end and tangent to said surface, with said fibers extending generally equal distances from said other surface and wherein fibers extending from normally opposed portions of said torque transmitting surfaces extend from said surfaces in opposite circular directions about said common axis a distance sufficient to position the free end of each said fiber nearer the opposed surface than the surface from which it extends, whereby said fibers extending from opposed portions of said torque transmitting surfaces intermesh and torque may be transmitted from said rotatable member to said other member through said fibers.

5. A torque transmitting device as recited in claim 4 wherein said fibers extend from each of said torque transmitting surfaces in a single circular direction about said common axis and in opposite circular directions from said opposed surfaces.

6. A torque transmitting device as recited in claim 5 wherein said torque transmitting members comprise a pair of cylinders and including means supporting said pair of cylinders for relative axial movement to permit offsetting of said normally opposed portions of said torque transmitting surfaces.

7. A torque transmitting device as recited in claim 5 wherein said other member is independently supported for rotation about said common axis to form a unidirectional clutch.

8. A torque transmitting device as recited in claim 5 including means supporting said pair of torque transmitting members for relative axial movement to permit disengagement of said opposed fibers.

* * * * *